Nov. 1, 1966  J. R. THOMPSON  3,282,569
INFINITE-RATIO DRIVING INTERLOCK FOR YARDER
Filed March 15, 1965  3 Sheets-Sheet 1

JAMES R. THOMPSON
INVENTOR.
BY Seed & Berry
ATTORNEYS

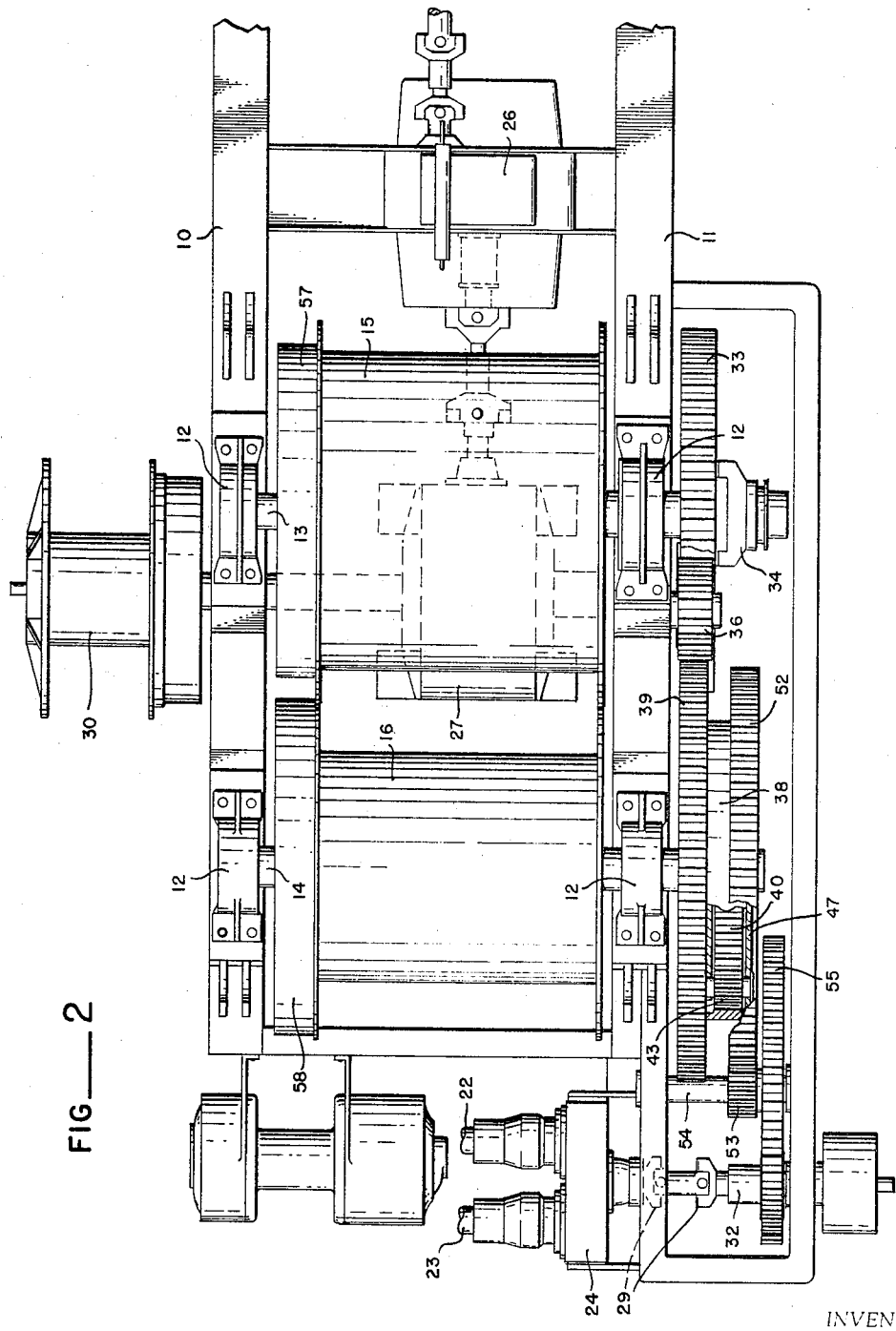

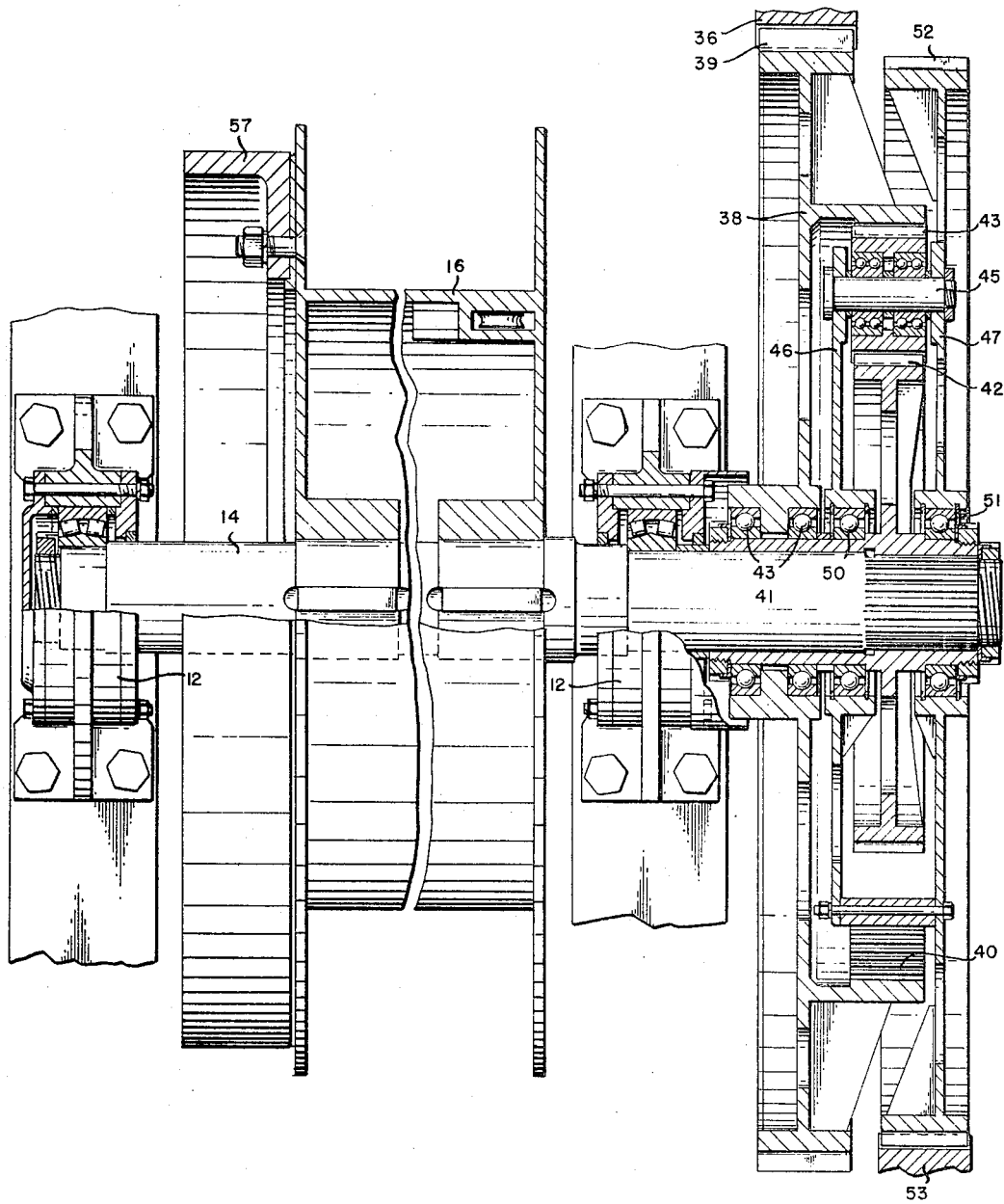
FIG__3
JAMES R. THOMPSON
INVENTOR.
BY *Seed & Berry*
ATTORNEYS

United States Patent Office 3,282,569
Patented Nov. 1, 1966

3,282,569
INFINITE-RATIO DRIVING INTERLOCK
FOR YARDER
James R. Thompson, Seattle, Wash., assignor to Washington Iron Works, Seattle, Wash., a corporation of Washington
Filed Mar. 15, 1965, Ser. No. 439,898
10 Claims. (Cl. 254—184)

This invention relates to an infinite-ratio driving interlock for a yarder. Yarders, a term descriptive of a machine for use in logging operations for hauling logs to a landing, commonly provide a number of powered drums. The function of two of these drums is to spool the main and the haul-back ends of a log-hauling cable, such cable being strung between the yarder and a tail block located at the extreme outer limit of the area being logged. A choker string is attached to the log-hauling or "main" line of the cable, and as the main spooling drum is powered for the inhaul run of such main line the condition of the main drum perforce changes from a bare wrap to a full wrap. At the same time the haul-back drum, paying out the haul-back line, changes from a full to a bare wrap. The converse occurs when the haul-back drum is powered to take in the haul-back line in obtaining an outhaul run of the main line of the cable.

In said inhaul run of the main line it is desirable that little or no slack be permitted in the haul-back line. It is especially important that the haul-back line be kept tight in downhill yarding. When both the main and haul-back lines are kept tight they tend to pick the leading end of the log off the ground. With the leading end of the log in the air, it clears obstructions on the ground, such as logs and stumps. It also prevents the log from running downhill and becoming unhooked from the choker.

During an inhaul run of the haul-back, an elimination of slack from the then trailing main line is of importance. Butt rigging and chokers are elevated above the ground and kept free of entanglement with logs and stumps if both the main and the haulback are taut at all times.

In my prior pending application, Ser. No. 398,191 I illustrate and describe an interlocking yarder having two independently employed sets of intermeshing powered gears which operate when drive-coupled to the drums to turn one drum faster than the other at an established ratio. The ratio is or may be the same but is in inverse order as between the two sets. The drive-coupling office is performed by friction clutches, and the operator is enabled to power the two drums through an infinite number of ratios by exerting a "braking" action upon a drum through the instrumentality of slipping a selected clutch. While to all intents and purposes there is, in said clutch-governed arrangement, no limit to the ratios which are available, the gear sets produce a positive interlock only when the clutches are fully engaged. The interlock, considered from a positive standpoint, is thus not infinite.

The present invention has as its principal object the provision of an interlocking yarder in which the interlock between the drums is positive through an infinite range of speed ratios.

With this and other more particular objects and advantages in view, and which will appear and be understood in the course of the following description and claims, the invention consists in the novel construction and in the adaptation and combination of parts hereinafter described and claimed.

In the accompanying drawings:

FIG. 2 is a fragmentary top plan view thereof drawn to an enlarged scale; and

FIG. 3 is a transverse vertical sectional view drawn to a yet larger scale on line 3—3 of FIG. 1.

Figure 1:
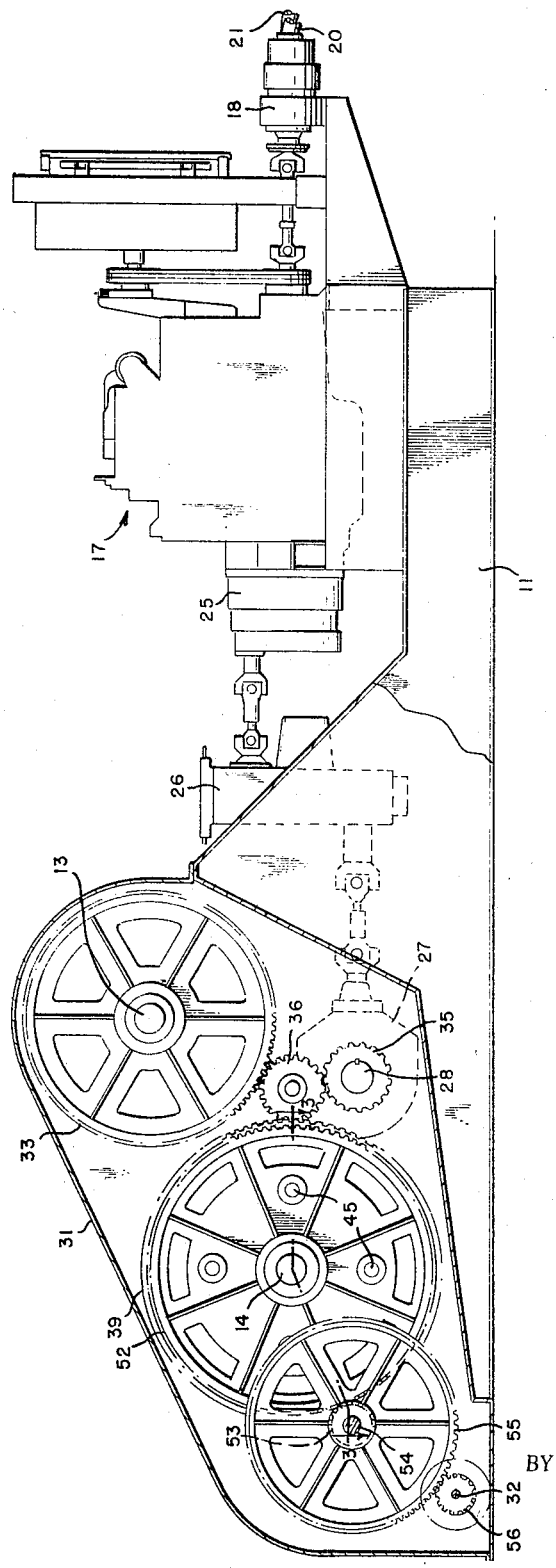
FIGURE 1 is a side elevational view illustrating a yarder constructed to embody preferred teachings of the present invention.

In said drawings there is illustrated a frame for the yarder comprised of side beams 10 and 11 connected by suitable cross-members. The side beams are or may be multi-level and I-section. At one end of the frame bearing assemblies 12 are bolted upon the side beams to provide journal mountings for cross-shafts 13 and 14 which carry a main spooling drum 15 and a haul-back spooling drum 16, respectively, and at the other end of the frame there is supported a power plant 17. A takeoff from the power plant drives a hydraulic variable displacement pump 18. The outfeed and infeed lines 20 and 21 from and to said pump connect by fluid-flow lines 22 and 23 to the two sides of a reversible hydraulic motor 24 located at the drum end of the yarder. The pump governs the volume and direction of hydraulic fluid flowing between the pump and the reversible hydraulic motor.

The main power of the power plant is passed longitudinally of the frame through a torque converter 25 into a transmission 26, and thence through a transfer case 27 to a transverse drive shaft 28 located below the two drum shafts 13 and 14 and more or less central thereto. The drive shaft is journaled in the side beams of the frame and has its two ends projecting beyond said beams. A straw-drum 30 is secured upon one of said projecting ends. A closed gear case 31 is provided at the side of the frame opposite said straw-drum. The other projecting end of the drive shaft is housed in the gear case, as are ends of the two drum shafts 13 and 14 and a stub shaft 32 connected by universals 29 with the reversible hydraulic motor 24.

A gear wheel 33 is journaled for rotation upon said end of the main drum shaft 13 and is adapted to be coupled to or uncoupled from the shaft at will. A manual jaw clutch 34 is illustrated for this purpose.

A pinion 35 is fixed to the housed end of the drive shaft 28 and acts through an intermediate pinion 36 to drive (1) the gear wheel 33 and (2) one of the two gears of a multi-gear wheel 38. The gear so driven has external teeth and is denoted by 39. The other gear presents internal teeth and is denoted by 40. Said multi-gear wheel is journaled for rotation about the center of the haulback drum shaft 14 as an axis. More particularly, the housed end of said shaft 14 has the hub 41 of a pinion 42 splined thereto, and a hub for the multi-gear wheel receives a journal from a pair of ball-bearing assemblies 43 which are fitted on the hub 41.

Pinion 42 functions as the sun gear of a planetary gear system having its planetary pinions 43 meshing the internally toothed gear 40. The planetary pinions turn about spindles 45, and producing a spider for the spindles are two connected carrier plates 46 and 47 each journaled for rotation upon a respective ball-bearing assembly, as 50 and 51, fitted on the hub 41 of the sun gear.

The outer carrier plate 47 present an externally toothed perimeter. The external teeth 52 are meshed by a pinion 53 fixed to a free-turning shaft 54. Also fixed to this shaft is a gear wheel 55. A pinion 56 fixed to the stub shaft 32 meshes such gear wheel 55. Each of the spooling drums is equipped with the usual brake (not shown) functional to a brake drum, as 57 and 58.

It will be seen that the operator, by establishing a hydraulic lock in the hydraulic system, can hold the spider of the planetary gear system stationary. When the spider is in this condition, and a drive is being passed from the power plant to the shaft 28 so as to drive the pinion 35, and assuming that the jaw clutch for the main drum is engaged, the speed ratio between the main drum and the haul-back drum is a constant. This is to say that the relative speed of the two drum simply reflects the end ratio, as between the drive pinion 35 and the gear 33 on the one hand, and said pinion 35 and the sun gear 42 on the other hand. This ratio is desirably so engineered that when the wraps of cable upon the two drums are more or less at a mid point between the two extremes of a full drum and a bare drum, the relative speeds at which the drums are turning causes cable to be paid out from one and drawn to the other at very nearly the same line speed. Each drum must of course carry a given number of wraps if this condition is to obtain and thus, under actual operation where one drum has no more than a few turns remaining in said given wrap at the moment that the cable being wound on the other drum reaches its said given wrap, there may be no more than a short interval during which said condition of uniform line speed, as a consequence of the engineered ratio, will prevail. The practice heretofore has been to pass drive into the drums through friction clutches, and to slip one or the other of these clutches in the degree necessary to maintain the two line speeds relatively constant. There is considerable wear on the clutches in consequence of this slip control, and there is also a substantial power loss dissipated in heat.

In the present structure there is maintained between the two drums a positive interlock at all times, and the operator through control of the direction and the speed at which the hydraulic motor turns the spider of the planetary gear system is enabled to produce at will infinite ratios between the speed at which the main drum turns and that at which the haul-back drum turns. Assuming that the multi-gear wheel 38 is turning in a clockwise direction, considered from the vantage point of FIG. 1, which acts through the planetary gear system to turn the haul-back drum in a counter-clockwise direction, the speed of the haul-back drum is increased relative to the speed of the counter-turning main drum by operating the hydraulic motor in a direction causing the spider to turn counter-clockwise. The relative speed is decreased by causing the spider to move clockwise. The faster this counter-clockwise or clockwise motion, as the case may be, of the spider, the greater is the increase and the decrease, respectively, in the speed of the haul-back drum relative to that of the main drum.

It should perhaps be noted that power is regenerated and fed back through the hydraulic motor to the power plant under a condition in which pull force exerted by the haul-back cable is responsible for unwinding the cable from the haul-back drum.

It is thought that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:
1. An interlocking yarder for use with a tail block for spooling the main and the haul-back ends of a cable strung through said block, comprising: a respective spooling drum for each of said cable ends, a power plant, a driving connection between the power plant and one of said spooling drums, a driving connection including a sun gear, planetary gears, and spider of a planetary gear system between the power plant and the other of said spooling drums, the planetary gears being meshed by a gear wheel driven from the power plant, the sun gear being fixed to the other spooling drum, the sun gear and the gear wheel comprising the output and input end, respectively, of the planetary gear system, and power-driven means independent of said last-named drive connection made functional to the spider component of the planetary gear system for either increasing or decreasing, at will, the ratio between the speeds at which the input and output ends of the planetary gear system turn, said independent power-driven means comprising a reversible hydraulic motor, the fluid system for said hydraulic motor selectively causing a hydraulic lock to be established upon the hydraulic motor for responsively holding said spider in an arrested condition.

2. An interlocking yarder as claimed in claim 1, the hydraulic motor being powered by a pump driven from the power plant.

3. An interlocking yarder as claimed in claim 1, the drum related to said driving connection which includes the planetary gear system having the haul-back end of the cable spooled thereon.

4. An interlocking yarder as claimed in claim 1, the planetary gear system comprising: the sun gear being fixed to the related spooling drum so as to turn therewith about the center of the drum as an axis.

5. An interlocking yarder as claimed in claim 4, the drive to the gear wheel comprising a power-driven pinion in mesh therewith and also in mesh with a gear wheel which is drive-coupled to the first-named spooling drum.

6. An interlocking yarder as claimed in claim 4, the drive to the gear wheel comprising a power-driven pinion in mesh therewith and also in mesh with a gear wheel which is coupled by a manually controlled clutch to the first-named spooling drum.

7. An interlocking yarder as claimed in claim 4, the spider comprising two connected plates located upon opposite sides of the sun gear said planetary gears and having gear teeth extending about the periphery of one of the plates, the drive from the hydraulic motor to the spider comprising reduction gearing including a pinion meshing said peripheral teeth of the spider.

8. An interlocking yarder as claimed in claim 4, the spooling drum which said sun gear drives being carried by a mounting shaft to which a hub of the sun gear is splined, the journals for the gear wheel and the spider components of the planetary gearing system being carried by said hub of the sun gear.

9. An interlocking yarder for use with a tail block for spooling the main and the haul-back ends of a cable strung through said block, comprising: spooling drums placed side by side one for each of said cable ends, mounting shafts to which the drums are fixed and each journaled for rotation in bearings located upon opposite ends of the drums and each projecting by a like end beyond a related one of said bearings, a respective input gear wheel for each of said drums mounted upon said projecting ends of the shafts for rotation about the center of the latter as an axis and in one instance direct-connected to the related shaft and in the other instance indirectly connected to the related shaft, said indirect connection comprising planetary gears carried by a spider in meshing position between a sun gear fixed to the shaft and an annular gear made integral with the input gear wheel, an annular gear made integral with the spider, a driving gear meshing the input gear wheels, a driving gear meshing the annular gear which is integral with the spider, means for passing power controlled both as to speed and direction to the first named driving gear, and a means independent of the last-named means for passing power controlled both as to speed and direction to the last-named driving gear so as to responsively govern the spider and thereby either increase or decrease, at will, the ratio between the speeds at which the sun gear and said annular gear meshed by the planetary gears turn, all of said gearing being housed in an oil-tight casing.

10. An interlocking yarder as claimed in claim 9 in which the sun gear provides a hub of extended length splined to the related drum shaft, the reltaed input gear wheel and the spider being journaled upon bearings carried by said hub.

References Cited by the Examiner
UNITED STATES PATENTS

| | | | |
|---|---|---|---|
| 1,395,735 | 11/1921 | Sawyer | 254—184 |
| 1,634,766 | 7/1927 | Barrett. | |
| 1,723,231 | 8/1929 | Ellsworth | 74—675 |
| 1,850,440 | 3/1932 | Berger | 254—184 |
| 1,958,037 | 5/1934 | Engler | 254—184 |
| 2,589,172 | 3/1952 | Wagner | 254—184 X |

SAMUEL F. COLEMAN, *Primary Examiner.*